United States Patent [19]
Humphrey

[11] 3,870,634
[45] Mar. 11, 1975

[54] MARINE SEWAGE TREATMENT SYSTEM FOR WATER CRAFT
[76] Inventor: Frank Humphrey, P. O. Box 74966, Oklahoma City, Okla. 73107
[22] Filed: May 8, 1974
[21] Appl. No.: 467,932

Related U.S. Application Data
[63] Continuation-in-part of Ser. No. 258,719, June 1, 1972, abandoned.

[52] U.S. Cl.................. 210/220, 210/241, 210/260
[51] Int. Cl........................ B01d 23/02, B01d 21/10
[58] Field of Search ............. 210/97, 104, 152, 260, 210/241, 220, 221

[56] References Cited
UNITED STATES PATENTS
| | | | |
|---|---|---|---|
| 691,365 | 1/1902 | Dittler | 210/260 X |
| 3,272,338 | 9/1966 | Gallagher | 210/152 X |
| 3,379,311 | 4/1968 | Kulka | 210/97 |
| 3,472,390 | 10/1969 | Pall et al. | 210/152 X |
| 3,701,426 | 10/1972 | Wetzel | 210/152 |

Primary Examiner—John Adee
Attorney, Agent, or Firm—Dunlap & Codding

[57] ABSTRACT

A marine sewage treatment system having a digestor unit including a first tank receiving the sewage effluent, a secondary treatment unit including a second tank receiving the fluid discharged from the first tank and a final filter receiving the fluid discharged from the second tank, the first and the second tanks including baffles controlling the flow of fluid within the tanks and the first and the second tanks each being supported via a guide and anchor assembly for automatically leveling and agitating the fluid within the first and the second tanks.

11 Claims, 7 Drawing Figures

MARINE SEWAGE TREATMENT SYSTEM FOR WATER CRAFT

CROSS REFERENCE TO RELATED APPLICATIONS

This application is a continuation-in-part of the Applicant's co-pending application entitled MARINE SEWAGE TREATMENT SYSTEM FOR WATER CRAFT, Ser. No. 258,719, filed June 1, 1972 now abandoned.

BACKGROUND OF THE INVENTION

1. Field of the Invention

This invention relates generally to marine sewage treatment systems and, more particularly, but not by way of limitation, to an apparatus for automatically leveling and agitating tanks included in a marine sewage treatment system.

2. Brief Description of the Prior Art

Various sewage treatment systems have been proposed in the past, such as those systems disclosed in U.S. Pat. No. 691,365, issued to Dittler, and U.S. Pat. No. 3,379,311, issued to Kulka. The Dittler patent disclosed a sewage treatment system having a first and a second baffled tank and a final filtering stage; however, the Dittler patent did not provide a support for the tanks which produces agitation of the fluid while automatically leveling the fluid as a marine vessel moves in the water, and the Dittler patent did not suggest a baffle system in the tanks controlling the fluid flow to force the fluid to the top fluid level for efficient aeration.

U.S. Pat. No. 3,472,390, issued to Pall; U.S. Pat. No. 3,272,338, issued to Gallagher; and U.S. Pat. No. 3,701,426, issued to Wetzel, each disclosed sewage treatment methods and apparatus having baffled tanks and some means for agitating or moving the fluid within the tanks.

U.S. Pat. No. 3,356,060, issued to Field, disclosed a ship stabilizer having apertured baffle plates (the disclosure with respect to FIG. 4 particularly referring to the openings 42 and the smaller cuts 44 in the bulkhead 32). U.S. Pat. No. 3,368,509, issued to Knight, also disclosed apertured plates (FIG. 4) utilized in a drill ship construction, the size of the openings in the apertured baffle plates being particularly disclosed with respect to FIG. 4.

U.S. Pat. No. 3,156,646, issued to Cameron, disclosed a digestor having a primary settling chamber including a plurality of barriers or baffles spaced a distance from the top of the chamber and dividing the primary chamber into a plurality of compartments. The primary settling chamber was connected to a digestion chamber constructed to form an upper supernatant liquid layer and a lower sludge layer and a conduit connected the lower regions of one of the compartments of the primary settling chamber, the liquid layer, the sludge layer, and an outside disposal zone.

U.S. Pat. No. 3,210,053, issued to Boester, disclosed an agitator and air system utilized in an aerator structure.

U.S. Pat. No. 962,606, issued to Wiest, disclosed a plurality of tanks wherein a pipe extended from near the bottom of each tank up into the next adjoining tank near the top thereof and a plurality of valves were included in the partition walls of each tank, one of the tanks having an outlet for the sewage. This system also included an aseptic bed having a number of apertured pipes arranged on the top of the bed and connected to the tanks.

U.S. Pat. No. 286,976, issued to Utley, disclosed a stall construction for installation on a vessel having a self-leveling aspect with respect to the roll of the ship. The stall was supported about a pivotal connection at j.

U.S. Pat. No. 598,468, issued to Lynn, disclosed a general arrangement of a filter having different levels of filter material therein.

U.S. Pat. No. 674,597, issued to Buckel, disclosed a vessel having a chamber (7) journalled on a shaft to carry any desired load in a manner compensating for the roll of the boat - a self-leveling type of structure.

U.S. Pat. No. 560,261, issued to Durant, disclosed a filter having different layers of filter material.

U.S. Pat. No. 3,656,624, issued to Walton, disclosed a waste collecting vessel and was constructed to pick up oil or the like from a body of water and included a chamber wherein the oil and water are separated, the clean water being returned.

U.S. Pat. No. 3,202,285, issued to Williams, disclosed a sewage treatment plant having two tanks with a baffle arrangement in each of the tanks to direct the flow of sewage in a predetermined manner.

U.S. Pat. No. 2,938,630, issued to Novak, disclosed a system utilizing a pump and pump control (51-52).

U.S. Pat. No. 2,277,171, issued to Traylor, disclosed a self-leveling platform for supporting separators. The platform was suspended from a main structure in such a manner that the platform generally pivoted about a central point compensating for the liquid flow.

U.S. Pat. No. 2,092,716, issued to Hungerford, disclosed a spray system for discharging water on the top of filtering material contained within the tank.

U.S. Pat. No. 2,024,822, issued to Hort, disclosed a system for transferring ballast in a ship to maintain stabilization via liquid filled tanks.

U.S. Pat. No. 1,454,723, issued to Burtis, disclosed a sewage disposal system having interconnected tanks.

U.S. Pat. No. 1,105,009, issued to Szepessy, disclosed a ship constructed to provide a self-leveling ballast via pivoting an inner structure about a central pivot point (see FIG. 2).

U.S. Pat. No. 3,515,278, issued to Wilson, disclosed a sewage treatment apparatus which may be utilized on a vessel. One of the tanks has a plurality of upright partitions forming a series of chambers through which the sewage was circulated including a passage between each of the chambers. The raw sewage and water was admitted into the first chamber and a disinfecting chemical solution was also admitted into the first chamber and mixed with the raw sewage, the mixture passing through a first through a fifth chamber and being discharge from the fifth chamber as a sterilized effluent.

U.S. Pat. No. 3,306,447, issued to Medeiros, disclosed a general arrangement of apparatus utilized in water purification systems and a pump, including a baffled structured tank.

U.S. Pat. No. 2,248,077, issued to Harris, disclosed an egg filtering and treating apparatus having a baffled tank wherein the plates forming the baffled tank were cascaded forcing the egg material to pass in a predetermined path causing the larger pieces of egg shells and the like to settle out while maintaining the agitation below a level sufficient to cause foaming of the egg material.

U.S. Pat. No. 2,176,549, issued to Smith, disclosed the utilization of different filtering materials packed in a water softening apparatus container.

SUMMARY OF THE INVENTION

An object of the invention is to provide an improved baffle assembly for tanks included within a marine sewage treatment system.

Another object of the invention is to provide an improved support for tanks included within a marine sewage treatment system.

One other object of the invention is to provide a marine sewage treatment system which is economical in the construction and operation thereof.

Other objects and advantages of the invention will be evident from the following detailed description when read in conjunction with the accompanying drawings which illustrate one preferred embodiment of the invention.

DESCRIPTION OF THE PREFERRED EMBODIMENT

Figure 1:
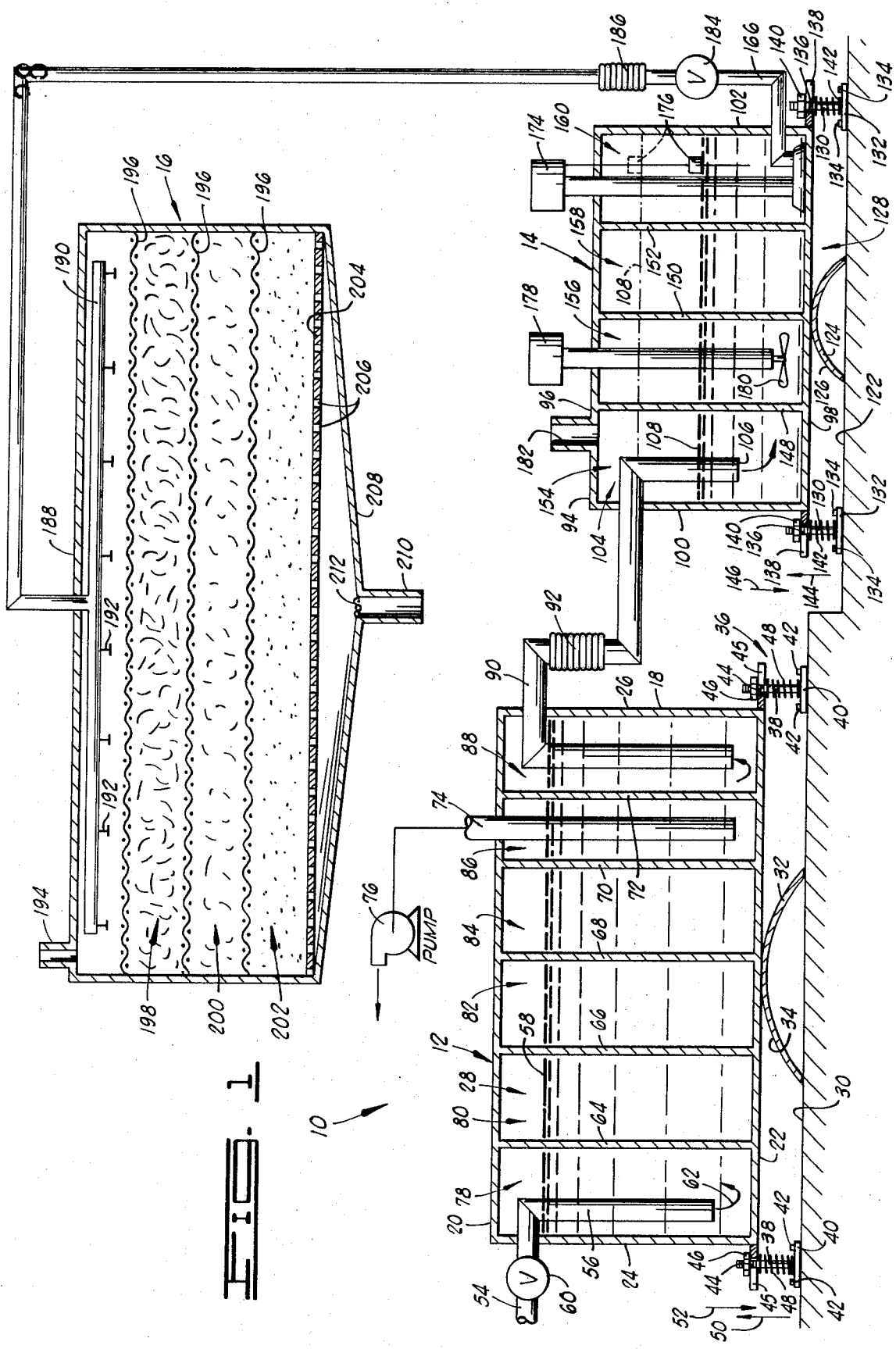
FIG. 1 is a partial elevational, partial sectional view of a marine sewage treatment system constructed in accordance with the invention.

Referring to the drawings in general and to FIGS. 1, 2, 3 and 4 in particular, shown therein and designated via the general reference numberal 10 is a marine sewage treatment system constructed in accordance with the invention. The marine sewage treatment system 10 includes a digestor unit 12 receiving sewage effluent and functioning as a primary treatment unit, a secondary treatment unit 14 receiving the fluid discharged from the digestor 12 and discharging fluid to a final filter unit 16, the primary treatment unit 12 being connected to one side of the secondary treatment unit 14 and the final filter unit 16 being connected to the opposite side of the secondary treatment unit 14.

The digestor unit 12 includes a first tank 18 preferably constructed of non-corrosive material having a top 20, a bottom 22, opposite ends 24 and 26, and a chamber 28 formed within the first tank 18 for receiving the sewage effluent discharged into the marine sewage treatment system 10 and retaining a predetermined amount of the sewage effluent. The first tank 18 is supported on a base 30 secured to a portion of the marine vessel or, in one form, the base 30 may be one of the structural surfaces of the marine vessel per se, for example. More particularly, the first tank 18 is supported on an anchor 32 which is secured to the base 30. The anchor 32 is preferably hemispherically shaped forming a partially spherically shaped tank supporting surface 34 engaging a central portion of the first tank 18 generally supporting the first tank 18 a predetermined distance above the base 30.

The anchor 32 forms a portion of a guide and anchor assembly 36 for supporting, automatically leveling and agitating the fluid within the first tank 18. The guide and anchor assembly 36 also includes a plurality of guides 38 spaced about the outer periphery of the bottom 22 of the first tank 18. Each guide 38 has a flange 40 formed on one end thereof, each guide 38 being secured to the base 30 via a plurality of fasteners 42. The end of each guide 38, opposite the end having the flange 40 formed thereon, extends upwardly from the base 30 through an opening 44 formed through a flange 45 portion formed on the first tank 18 generally adjacent the bottom 22 and extending a distance generally perpendicularly from the first tank 18. A portion of each guide 38 is threaded and a retaining member 46 is threadedly secured to the end of each guide 38 extending through the flange 45. A spring 48 is disposed about each guide 38, each spring 48 engaging the bottom 22 of the first tank 18 and the base 30 biasing the bottom 22 in an upwardly direction 50 toward a level position with respect to the anchor 32, as shown in FIG. 1. In a preferred form and as shown in FIG. 1, the spring 48, more particularly, engages the flange 45 and biases the first tank 18 in the upwardly direction 50 via the connection between the flange 45 and the first tank 18. In one form, the flange 45 is formed on the first tank 18 and extends annularly thereabout and, in one other form, a plurality of flanges 45 are connected to the first tank 18 and spaced thereabout for connection with the guides 38.

The balance of the first tank 18 on the anchor 32, the fluid within the first tank 18 chamber 28, and the movement of the fluid within the first tank 18 chamber 28 causes the first tank 18 to pivotally move in the upwardly direction 50 and in a downwardly direction 52 about the anchor 32 during the operation of the marine sewage treatment system 10 of the present invention. The pivotal movement of the first tank 18 also results from the movement of the marine vessel in the water causing the shifting movement of the fluid in the first tank 18. The springs 48 and the retaining members 46 cooperate to limit and cushion the pivotal movement of the first tank 18 about the anchor 32. The guides 38 cooperate to guide the movement of the first tank 18 and to maintain the first tank 18 positioned on the anchor 32 during the pivotal movement of the first tank 18 about the anchor 32.

An inlet pipe 54 is connected to the first tank 18 and a portion 56 of the inlet pipe 54 extends downwardly through the first tank 18 to a position disposing one end thereof generally below a fluid level 58 within the first tank 18 chamber 28. A leveling valve 60 is interposed in the inlet pipe 54. The inlet pipe 54 receives the sewage effluent and discharges the sewage effluent into the first tank 18 chamber 28, as indicated via the directional flow arrow 62 in FIG. 1.

Spaced apart and fixedly secured within the chamber 28 of the first tank 18 are baffles 64, 66, 68, 70 and 72, each baffle extending generally between the top 20 and the bottom 22 of the first tank 18. One end portion of a suction pump pipe 74 is disposed through the top 20 of the first tank 18 and extends downwardly toward the bottom 22 a distance below the fluid level 58, the one end portion of the suction pump pipe 74 being disposed between the baffles 70 and 72, the opposite end of the suction pump pipe 74 being connected to a suction pump 76 for withdrawing the fluid from the first tank 18 chamber 28 in an activated position of the suction pump 76 during the cleaning of the first tank 18.

The baffles 64, 66, 68, 70 and 72 define compartments 78, 80, 82, 84, 86 and 88 within the first tank 18 chamber 28. A portion of an outlet pipe 90 extends through the end 26 of the first tank 18 disposing one end portion thereof within the first tank 18 chamber 28 below the fluid level 58, the outlet pipe 90 receiving and discharging the fluid from the first tank 18. The portion of the outlet pipe 90, opposite the end portion disposed within the first tank 18 chamber 22 extends from the first tank 18 and is coupled by a flexible coupling 92 to the secondary treatment unit 14.

The secondary treatment unit 14 includes a second tank 94 having a top 96, a bottom 98 and opposite ends 100 and 102. A chamber 104 is formed within the second tank 94 for retaining a predetermined amount of fluid. An end 106 of the outlet pipe 90 extends through the end 100 of the second tank 94 and downwardly to a position disposing the end 106 thereof, opposite the end disposed in the first tank 18, within the second tank 94 chamber 104 and below a fluid level 108. As shown in FIG. 1, the second tank 94 fluid level 108 is disposed below the first tank 18 fluid level 58 facilitating the flow of fluid discharging from the first tank 18 into the second tank 94.

Figures 2, 3:
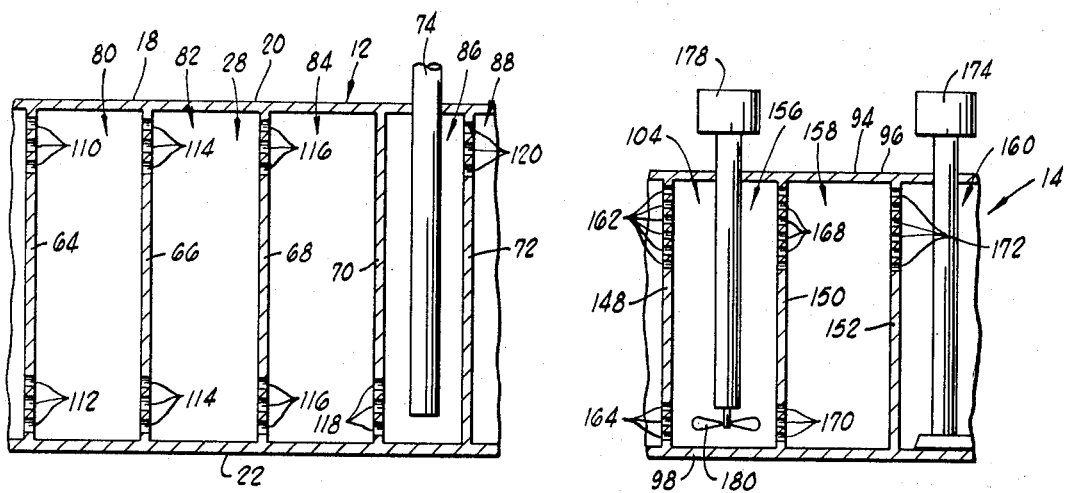
FIG. 2 is an enlarged, fragmentary view of a portion of the first tank of the marine sewage treatment system of FIG. 1.
FIG. 3 is an enlarged, fragmentary view of a portion of the second tank of the marine sewage treatment system of FIG. 1.
Figure 4:
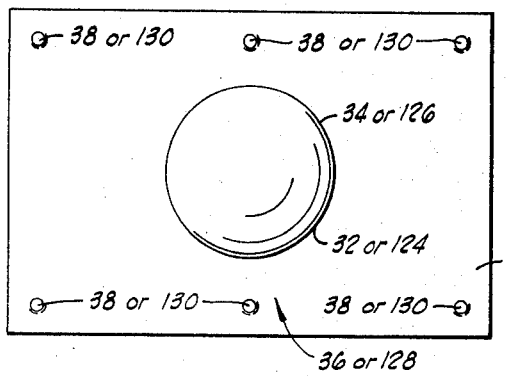
FIG. 4 is a partial sectional, partial elevational view showing a typical arrangement of the guides and anchor supporting the digestor and the secondary treatment unit of FIG. 1.

Referring more particularly to FIG. 2, baffle openings 110 and 112 are formed through the baffle 64, the baffle openings 110 being disposed near the top 20 or, more particularly, near the fluid level 58 and the baffle openings 112 being disposed near the bottom 22 of the first tank 18, the baffle openings 110 and 112 forming passageways for the fluid moving through the first tank 18 chamber 28 toward the outlet pipe 90. The baffle 66 includes similar baffle openings 114 and the baffle 68 is also provided with baffle openings 116, the baffle openings 116 having a diameter smaller than the baffle openings 110, 112 and 114 of the baffles 64 and 66. The baffle 70 includes baffle openings 118 through a lowermost portion thereof generally near the first tank 18 bottom 22 and the baffle 72 includes baffle openings 120 through an uppermost portion thereof near the first tank 18 top 20 or, more particularly, near the fluid level 58, the baffle openings 120 being disposed near the fluid level 58 to force the fluid within the first tank 18 toward the top 20 or, more particularly, toward fluid level 58 for more efficient aeration as the fluid is processed through the first tank 18.

The second tank 94 is supported on a base 122 or, more particularly, on an anchor 124 which is secured to the base 122 and has a tank supporting surface 126 engaging a portion of the second tank 94 bottom 98 and pivotally supporting the second tank 94 in a manner similar to the anchor 32 supporting the first tank 18. The base 122 and the anchor 124 form a portion of a guide and anchor assembly 128 for supporting, automatically leveling and agitating the fluid within the second tank 94. The guide and anchor assembly 128 also includes a plurality of guides 130 spaced about the outer periphery of the bottom 98 of the second tank 94. Each guide 130 has a flange 132 formed on one end thereof, each guide 130 being secured to the base 122 via a plurality of fasteners 134. The end of each guide 130, opposite the end having the flange 132 formed thereon, extends upwardly from the base 122 through an opening 136 formed through a flange 138 portion formed on the second tank 94 generally adjacent the bottom 98 and extending a distance generally perpendicularly from the second tank 94. A portion of each guide 130 is threaded and a retaining member 140 is threadedly secured to the end of each guide 130 extending through the flange 138. A spring 142 is disposed about each guide 130, each spring 142 engaging the bottom 98 of the second tank 94 and the base 122 biasing the bottom 98 in an upwardly direction 144 toward a level position with respect to the anchor 124, as shown in FIG. 1. In a preferred form, the spring 142, more particularly, engages the flange 138 and biases the second tank 94 in the upwardly direction 144 via the connection between the flange 138 and the second tank 94. In one form, the flange 138 is formed on the second tank 94 and extends annularly thereabout and, in one other form, a plurality of flanges 138 are connected to the second tank 94 and spaced thereabout for connection with the guides 130.

The balance of the second tank 94 on the anchor 124, the fluid within the second tank 94, and the movement of the fluid within the second tank 94 chamber 104 causes the second tank 94 to pivotally move in the upwardly direction 144 and in a downwardly direction 146 about the anchor 124 during the operation of the marine sewage treatment system 10 of the present invention. The pivotal movement of the second tank 94 also results from the movement of the marine vessel in the water causing the shifting movement of the fluid in the second tank 94. The springs 142 and the retaining member 140 cooperate to limit and cushion the pivotal movement of the second tank 94 about the anchor 124. The guides 130 cooperate to guide the movement of the second tank 94 and to maintain the second tank 94 positioned on the anchor 124 during the pivotal movement of the second tank 94 about the anchor 124.

A plurality of spaced baffles 148, 150 and 152 are disposed within the second tank 94 chamber 104 extending generally between and connected to the second tank 94 bottom 98 and the second tank 94 top 96. The baffles 148, 150 and 152 are vertically secured and spaced apart in the second tank 94 chamber 104 defining compartments 154, 156, 158 and 160.

Referring more particularly to FIG. 3, baffle openings 162 and 164 are formed through the baffle 148, the baffle openings 160 being disposed near the top 96 or, more particularly, near the fluid level 108 and the baffle openings 162 being disposed near the bottom 98 of the second tank 94, the baffle openings 160 and 162 forming passageways for the fluid moving through the second tank 94 chamber 104 toward an outlet pipe 166. The baffle 150 includes similar baffle openings 168 and 170 disposed near the fluid level 108 and the second tank 94 bottom 98. The baffle 152 has baffle openings 172 formed through an uppermost portion thereof near the second tank 94 top 96 or, more particularly, near the fluid level 108, the baffle openings 172 being disposed near the fluid level 108 to force the fluid within the second tank 94 toward the top 96 or, more particularly, toward the fluid level 108 for more efficient aeration as the fluid is processed through the second tank 94. In a preferred form, the baffle openings 172 are smaller than the baffle openings formed through the baffles 148 and 150. As shown in FIG. 2, there are a greater number of baffle openings 160, 168 and 172 in the uppermost portion of the baffles 148, 150 and 152 as compared to the number of baffle openings 162 and 170 in the lower portions of the baffles 148 and 150 thereby still further encouraging the flow of the fluid toward the fluid level 108.

An electrically driven pump 174 is supported on the second tank 94 having a pump suction disposed within the second tank 94 chamber 104 below the fluid level 108, the pump 174 discharge being connected to one end of the outlet pipe 166 extending through the end 102 of the second tank 94. The end of the outlet pipe 166, which is connected to the pump 174, is disposed below the fluid level 108 within the second tank 94 chamber 104, as shown in FIG. 1. The pump 174 pumps the fluid from the second tank 94 through the outlet pipe 166 discharging the fluid from the second tank 94 chamber 104. The pump 174 is connected to an automatic float and switch 176 for maintaining the fluid level 108 within the chamber 104 of the second tank 94, a high fluid level 108 being shown in FIG. 1 in dashed-lines. An electrically operated agitator 178 having a blade 180 is supported on the second tank 94, the blade 180 being disposed below the fluid level 108 within the second tank 94 chamber 104.

One end of an air inlet pipe 182 is connected to the top 96 of the second tank 94 for introducing air at atmospheric pressure into the second tank 94 and into the marine sewage treatment system 10.

The outlet pipe 166, more particularly, extends through the end 102 of the second tank 94 and a valve 184 is interposed in the outlet pipe 166. A flexible coupling 186 is interposed in the outlet pipe 166 between the valve 184 and the final filter unit 16. The outlet pipe 166 is connected to the final filter unit 16 and, more particularly, the end of the outlet pipe 166, opposite the end connected to the second tank 94, extends through a top wall 188 of the final filter unit 16. A horizontally disposed pipe extension 190 having spaced apart spray heads 192 which produces a spray at an angle of 180° is connected to the end of the outlet pipe 166 disposed within the final filter unit 16. Extending upwards from the top wall 188 of the final filter unit 16 is a pipe 194 which preferably extends above the top of the marine vessel (not shown) in which the marine sewage treatment system is installed. Fixedly secured in a horizontal position within the final filter unit 16 are spaced apart brass screens 196 which define separations for accommodating coarse filter material 198, the medium filter material 200 and the fine filter material 202. Fixedly secured within the bottom portion of the final filter unit 16 is a brass plate 204 having a plurality of spaced apart openings 206 for drainage of the fluid into the downwardly sloped sump portion 208 of the final filter unit 16. Extending downwards from the center of the sump portion 208 is an outlet pipe 210 which serves to discharge the fluid into open water. A strainer 212 of brass material is secured in the upper portion of the outlet pipe 210 for final screening.

The marine sewage treatment system of the present invention thus includes a baffled tank support on an anchor and including a plurality of guides, the tank being pivotable about the anchor following the movement of the marine vessel in the water thereby automatically positioning the tank to level the fluid retained therein and cooperating to automatically agitate the fluid retained within the fluid chamber thereby facilitating the decomposition of solid material which might plug the baffle openings, for example. The guides maintain the position of the tank on the anchor during the pivotal movement of the tank.

It should be noted that the marine sewage treatment system 10 described before is adaptable for vessels having a single water closet, a single galley sink and disposal, the vessel sleeping up to six persons, for example. The marine sewage treatment system 10 may be constructed on a larger or smaller scale depending upon the particular application.

Figure 5:
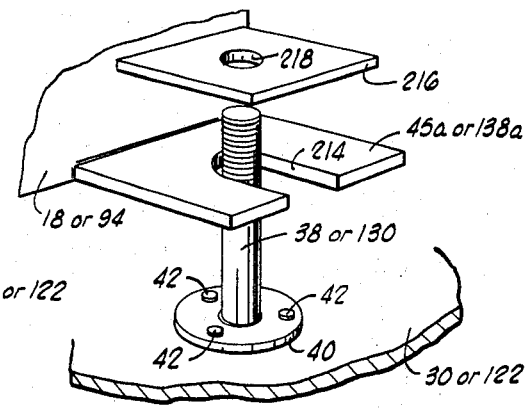
FIG. 5 is a fragmentary, partial perspective view showing a modified typical connection between the guides and either the digestor or the secondary treatment unit of FIG. 1.

Embodiment of FIG. 5

Shown in FIG. 5 is a typical modified connection between the guides 38 and 130 and the flanges 45a and 138a, respectively. The guides 38 and 130 are preferably cylindrically shaped elongated rods.

A plurality of recesses 214 are formed through the flanges 45a and 138a, the recesses 214 being spaced about the first tank 18 and the second tank 94. Each of the recesses 214 intersects the outer peripheral surface of the flanges 45a or 138a for accommodating the insertion of the guides 38 or 130 to an assembled position wherein the upper end portion of each of the guides 38 or 130 is disposed within one of the recesses 214.

In the assembled position of the guides 38 and 130 secured to the bases 30 and 122, respectively, a retaining plate 216 having an opening 218 is disposed about each of the guides 38 and 130. More particularly, the end of each guide 38 and 130, opposite the flange end, is disposed through the opening 218 in one of the retaining plates 216. In one form, each plate 216 is then positioned adjacent the flange 45a or 138a and secured thereto such as by bolting, for example. In any event, the retaining member 46 is then threadedly secured to each guide 38 and the retaining member 140 is threadedly secured to each guide 130 in a manner and for reasons mentioned before.

The embodiment shown in FIG. 5 provides one convenient and efficient apparatus for connecting the guides 38 and 130 to the flanges 45a and 138a, respectively, in such a manner that the guides 38 and 130 can each be easily installed or removed for replacement or repair.

Figure 6:
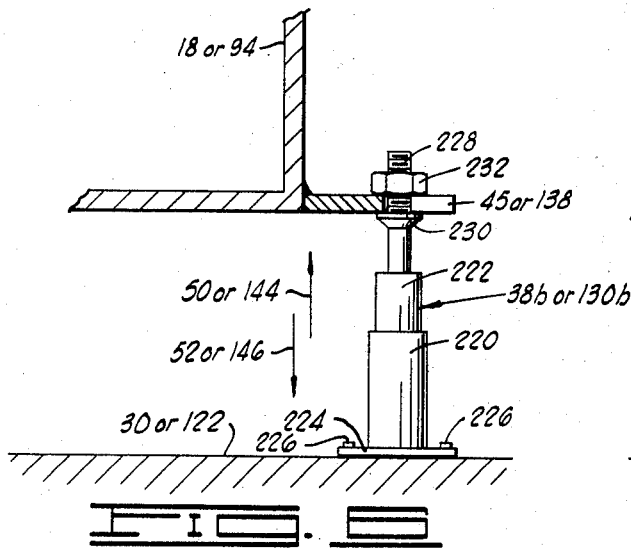
FIG. 6 is a partial sectional, partial elevational view showing a modified guide which can be utilized in connection with the guide and anchor assemblies of FIG. 1.

Embodiment of FIG. 6

Shown in FIG. 6 is a modified guide 38b or 130b which can be utilized with the guide and anchor assemblies 36 and 128. The guide 38b or 130b, more particularly, is constructed utilizing a shock absorber having a base cylinder 220 with a piston portion 222 reciprocatingly disposed in the base cylinder 220. A flange 224 is formed on one end of the base cylinder 220 and the shock absorber guide 38b and 130b is secured to the base 30 or 122 via a plurality of fasteners 226 extending through the flange 224 and the base 30 or 122. One end of a threaded rod 228 is secured to the piston portion 222 and the threaded rod 228 extends a distance from the piston portion 222. A shank 230 is formed on a portion of the rod 228, the shank 230 engaging a portion of the lower surface of the flange 45 or 138.

In an assembled position, the threaded rod 228 extends through the opening 44 or 136 formed through the flange 45 or 138, respectively, and is secured thereto via a retaining member 232 in a manner and for reasons similar to that described before with respect to the guides 38 and 130 shown in FIG. 1, the flange 45 or 138 being retained between the retaining member 232 and the shank 230. The shock absorber guide 38b or 130b cooperates as a portion of the guide and anchor assemblies in a manner and for reasons described before, the shock absorber providing a more desirable guide construction in some operational embodiments.

Figure 7:
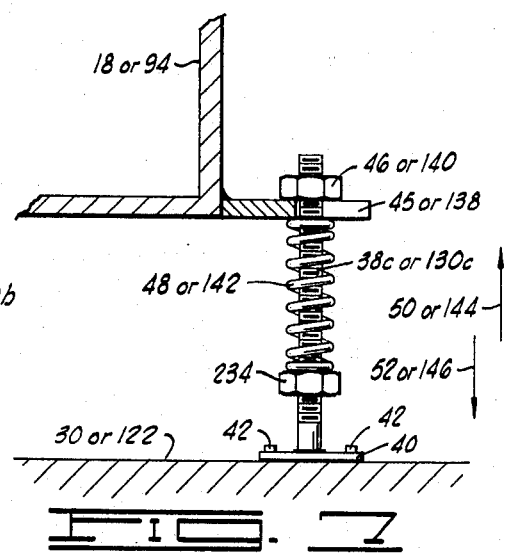
FIG. 7 is a partial sectional, partial elevational view showing yet another modified typical connection between the guides and either the digestor or the secondary treatment unit of FIG. 1.

Embodiment of FIG. 7

Shown in FIG. 7 is a modified guide 38c or 130c which is constructed exactly like the guides 38 and 130 described before, except the guides 38c and 130c include a nut 234 threadedly secured to each of the guides 38c and 130c in a position wherein each nut 232 engages the end of one of the springs 48 or 142, opposite the end of the spring 48 or 142 engaging the flange 45 or 138. Each nut 232 is positioned such that each nut 232 is threadedly movable in the upwardly direction 144 increasing the bias on the spring 48 or 142 and in the downwardly direction 146 decreasing the bias on the spring 48 or 142. The guides 38c and 130c thus function in a manner exactly like that described before with respect to the guides 38 and 130, but, the guides 38c and 130c also provide a construction wherein the bias on the springs 48 or 142 can be easily and conveniently adjusted which may be desirable in some applications.

Changes may be made in the construction and the operation of the various elements and assemblies described herein without departing from the spirit and the scope of the invention as defined in the following claims.

What is claimed is:

1. A marine sewage treatment system for installation on a marine vessel, comprising:

a first tank having a top, a bottom and a chamber for retaining a predetermined amount of fluid;

an inlet pipe having a portion extending through the first tank disposing one end thereof in the first tank chamber for discharging sewage effluent into the first tank chamber;

an outlet pipe having a portion extending through the first tank disposing one end thereof in the first tank chamber receiving fluid discharging from the first tank chamber;

a baffle disposed within the first tank chamber between the portions of the inlet pipe and the outlet pipe disposed in the first tank chamber, the baffle connected to the first tank and having baffle openings formed therethrough providing a passageway for the fluid discharged via the inlet pipe and moving through the first tank chamber toward the outlet pipe;

a base;

an anchor connected to the base and having a tank supporting surface engaging a portion of the first tank bottom supporting the first tank a distance above the base, the first tank being pivotable about the anchor agitating the fluid within the first tank chamber;

guides, each guide connected to the base and having a portion connected to the first tank bottom and cooperatingly positioning the first tank relative to the anchor during the pivotal movement of the first tank about the anchor; and means having a portion biasingly engaging the first tank bottom biasing the first tank toward a level position on the anchor, the first tank being pivotally movable about the anchor generally against the biasing force.

2. The apparatus of claim 1 defined further to include:

a plurality of spaced baffles, each baffle disposed within the first tank chamber between the portions of the inlet pipe and the outlet pipe disposed in the first tank chamber, each baffle connected to the first tank and having baffle openings formed therethrough providing passageways for the fluid discharged via the inlet pipe and moving through the first tank chamber toward the outlet pipe, the baffle openings in the baffles being sized to provide smaller fluid passageways as the fluid moves toward the outlet pipe.

3. The apparatus of claim 1 wherein the baffles disposed near the inlet pipe include baffle openings disposed near the first tank base and baffle openings disposed near the fluid level of the fluid retained within the first tank chamber; and wherein the baffle openings of the baffle disposed near the outlet pipe are disposed near the first tank top generally near the fluid level of the fluid retained within the first tank chamber thereby forcing the sewage effluent to the fluid level within the first tank chamber for efficient aeration.

4. The apparatus of claim 1 wherein the anchor is shaped to provide a generally spherically shaped tank supporting surface, and wherein the anchor is disposed to engage a central portion of the tank base.

5. The apparatus of claim 1 wherein the end of the inlet pipe disposed within the first tank chamber is defined further as being disposed below the fluid level of the fluid retained within the first tank chamber; and wherein the end of the outlet pipe disposed within the first tank chamber is defined further as being disposed below the fluid level of the fluid retained within the first tank chamber.

6. The apparatus of claim 1 defined further to include:

a secondary treatment unit, comprising:

a second tank having a top, a bottom and a chamber for retaining a predetermined amount of fluid, the end of the outlet pipe, opposite the end disposed within the first tank chamber being disposed within the second tank chamber generally below the fluid level of the fluid retained within the second tank chamber for discharging fluid from the first tank chamber into the second tank chamber, the fluid level within the second tank fluid chamber being below the fluid level within the first tank fluid chamber to facilitate the movement of fluid from the first tank fluid chamber to the second tank fluid chamber;

a base;

an anchor connected to the base and having a tank supported surface engaging a portion of the second tank bottom supporting the second tank a distance above the base, the second tank pivotable about the anchor agitating the fluid within the second tank chamber;

guides, each guide connected to the base and having a portion connected to the second tank bottom and cooperatingly positioning the second tank relative to the anchor during the pivotal movement of the second tank about the anchor;

means having a portion biasingly engaging the second tank limiting the pivotal movement of the second tank in the upwardly and downwardly directions and biasing the second tank toward a level position on the anchor, the second tank being pivotally movable about the anchor generally against the biasing force;

an outlet pipe having a portion extending through the second tank disposing one end thereof in the second tank chamber receiving and discharging fluid from the second tank chamber;

a plurality of spaced baffles, each baffle disposed within the second tank chamber between the portions of the inlet pipe and the outlet pipe disposed in the second tank chamber, each baffle connected to the second tank and having baffle openings formed therethrough providing passageways for the fluid discharged via the inlet pipe and moving through the second tank chamber toward the outlet pipe, the baffle openings in the baffles being sized to provide smaller fluid passageways as the fluid moves from the inlet pipe toward the outlet pipe, and the baffle openings in the baffle disposed near the outlet pipe being disposed near the second tank top generally near the fluid level of the fluid retained within the second tank chamber thereby forcing the sewage effluent within the second tank chamber to the fluid level within the second tank chamber for efficient aeration;

an air inlet pipe having one end portion connected to the second tank in communication with the second tank chamber introducing air into the second tank chamber; and a pump connected to the end of the outlet pipe disposed in the second tank chamber having a portion in fluidic communication with the fluid in the second tank chamber pumping the fluid from the second tank chamber through the discharge pipe connected thereto.

7. The apparatus of claim 6 defined further to include:

a filter having a top wall and a downwardly sloped sump portion with an opening formed in a portion of the sump portion, the fluid within the filter being drained therefrom via the opening in the sump portion and the end of the second-mentioned outlet pipe, opposite the end disposed within the second tank chamber, being connected to the filter;

spray means disposed in the filter having a portion connected to the end of the outlet pipe connected to the filter, the fluid from the outlet pipe discharged into the filter via the spray means; and filtering material disposed within the filter between the spray means and the opening in the sump portion of the filter, the fluid discharged via the spray means being filtered through the filtering material and discharged via the opening in the sump portion of the filter.

8. The apparatus of claim 7 defined further to include a plurality of spaced apart screens supported within the filter defining compartments; a coarse filtering material being retained within one of the compartments; a medium filtering material being retained within one other of the compartments; a fine filtering material being retained in one other of the compartments; and a base plate having a plurality of openings formed therethrough secured within the filter generally between the fine filtering material and the sump portion.

9. The apparatus of claim 1 defined further to include:

flange means connected to the first tank bottom; and wherein each guide is defined further as including a portion extending through the flange means; and wherein the apparatus includes: fastener means connected to the portion of each of the guides extending through the flange means engaging a portion of the flange means; and wherein the means biasingly engaging the first tank includes: a spring disposed about each guide, one end of the spring biasingly engaging the flange means biasing the first tank toward a level position on the anchor.

10. The apparatus of claim 9 defined further to include: means connected to each guide having a portion engaging the spring, said means positionable to adjust the biasing force of the spring.

11. A marine sewage treatment system for installation on a marine vessel, comprising:

a first tank having a top, a bottom and a chamber for retaining a predetermined amount of fluid;

an inlet pipe having a portion extending through the first tank disposing one end thereof in the first tank chamber for discharging sewage effluent into the first tank chamber;

an outlet pipe having a portion extending through the first tank disposing one end thereof in the first tank chamber receiving fluid discharging from the first tank chamber;

a plurality of spaced baffles disposed within the first tank chamber and connected to the first tank defining compartments within the first tank chamber, the baffles disposed within the first tank chamber between the portions of the inlet pipe and the outlet pipe disposed in the first tank chamber and each baffle having baffle openings formed therethrough providing passageways for the fluid discharged via the inlet pipe and moving through the first tank chamber toward the outlet pipe, the baffles near the inlet pipe having baffle openings near the first tank bottom and baffle openings near the fluid level of the fluid retained within the first tank chamber and the baffle disposed near the outlet pipe having baffle openings near the fluid level of the fluid retained within the first tank chamber;

a base;

an anchor connected to the base and having a tank supporting surface engaging a portion of the first tank bottom supporting the first tank a distance above the base, the first tank being pivotable about the anchor agitating the fluid within the first tank chamber;

means connected to the base and to the first tank base positioning the first tank relative to the anchor during the pivotal movement of the first tank about the anchor and having a portion limiting the pivotal movement of the first tank, said means automatically leveling and agitating the fluid within the first tank chamber;

a second tank having a top, a bottom and a chamber for retaining a predetermined amount of fluid, the end of the outlet pipe, opposite the end disposed within the first tank chamber being disposed within the second tank chamber generally below the fluid level of the fluid retained within the second tank chamber for discharging fluid from the first tank chamber into the second tank chamber, the fluid level within the second tank fluid chamber being below the fluid level within the first tank fluid chamber to facilitate the movement of fluid from the first tank fluid chamber to the second tank fluid chamber;

a plurality of spaced baffles, each baffle disposed within the second tank chamber between the portions of the inlet pipe and the outlet pipe disposed in the second tank chamber, each baffle connected to the second tank and having baffle openings formed therethrough providing passageways for the fluid discharged via the inlet pipe and moving through the second tank chamber toward the outlet pipe, the baffle openings in the baffles being sized to provide smaller fluid passageways as the fluid moves from the inlet pipe toward the outlet pipe, and the baffle openings in the baffle disposed near the outlet pipe being disposed near the second tank top generally near the fluid level of the fluid retained within the second tank chamber thereby forcing the sewage effluent within the second tank chamber to the fluid level within the second tank chamber for efficient aeration;

a base;

an anchor connected to the base and having a tank supporting surface engaging a portion of the second tank bottom supporting the second tank a distance above the base, the second tank pivotable about the anchor agitating the fluid within the second tank chamber;

means connected to the last-mentioned base and to the second tank bottom positioning the second tank relative to the anchor during the pivotal movement of the second tank about the anchor and having a portion limiting the pivotal movement of the second tank, said means automatically leveling and agitating the fluid within the second tank chamber;

an outlet pipe having a portion extending through the second tank disposing one end thereof in the second tank chamber receiving and discharging fluid from the second tank chamber;

an air inlet pipe having one end portion connected to the second tank in communication with the second tank chamber introducing air into the second tank chamber;

a pump connected to the end of the outlet pipe disposed in the second tank chamber having a portion in fluidic communication with the fluid in the second tank chamber pumping the fluid from the second tank chamber through the discharge pipe connected thereto;

an agitator supported on the second tank having a blade disposed below the fluid level of the fluid within the second tank chamber agitating the fluid in one position thereof; and a filter having a top wall and a downwardly sloped sump portion with an opening formed in a central portion of the sump portion, the fluid within the filter being drained therefrom via the opening in the sump portion and the end of the second-mentioned outlet pipe, opposite the end disposed within the second tank chamber, extending through a portion of the top wall of the filter.

* * * * *